United States Patent [19]
Takehara et al.

[11] Patent Number: 5,236,057
[45] Date of Patent: Aug. 17, 1993

[54] REAR WHEEL STEERING APPARATUS FOR VEHICLE

[75] Inventors: Shin Takehara, Higashi Hiroshima; Hiroshi Ohmura, Hatsukakaichi; Ryuya Akita, Hiroshima; Isamu Chikuma, Maebashi; Hiroyuki Ito, Maebashi; Hiroshi Eda, Maebashi, all of Japan

[73] Assignees: NSK Ltd., Tokyo; Mazda Motor Corporation, Hiroshima, both of Japan

[21] Appl. No.: 755,015

[22] Filed: Sep. 4, 1991

[30] Foreign Application Priority Data

Sep. 7, 1990 [JP] Japan .................... 2-235801
Sep. 26, 1990 [JP] Japan .................... 2-259350

[51] Int. Cl.⁵ .............................. B62D 5/06
[52] U.S. Cl. .................... 180/140; 180/142; 91/459
[58] Field of Search ............ 180/140, 132, 141, 142, 180/133; 280/91; 137/625.64; 91/365, 418, 459; 60/384, 400, 402

[56] References Cited

U.S. PATENT DOCUMENTS

| 4,543,875 | 10/1985 | Imhof | 91/459 |
| 4,669,567 | 6/1987 | Nakamura et al. | 180/140 |
| 4,834,204 | 5/1989 | Ito et al. | 180/142 |
| 4,880,072 | 11/1989 | Sakamoto et al. | 180/140 |
| 5,032,997 | 7/1991 | Kawagoe | 180/140 |
| 5,086,863 | 2/1992 | Tischer | 180/140 |

FOREIGN PATENT DOCUMENTS

| 3811312 | 10/1989 | Fed. Rep. of Germany . |
| 57-44568 | 3/1982 | Japan . |
| 0031979 | 2/1990 | Japan ............ 180/140 |
| 2083422 | 3/1982 | United Kingdom . |
| WO89/12568 | 12/1989 | World Int. Prop. O. . |

*Primary Examiner*—Russell D. Stormer
*Assistant Examiner*—Florian Zeender
*Attorney, Agent, or Firm*—Shapiro and Shapiro

[57] ABSTRACT

A rear wheel steering apparatus for a vehicle, comprises a hydraulic cylinder for displacing a steering rod connected to left and right rear wheels axially, a centering spring for biasing the steering rod toward a neutral position, and a centering spring cancelling mechanism for preventing a biasing force of the centering spring from acting on the steering rod. A partition wall of the hydraulic cylinder defines an oil chamber in the cylinder and is formed as a cup shape having a central concave portion which constitutes a pressure chamber of the centering spring cancelling mechanism.

12 Claims, 5 Drawing Sheets

REAR WHEEL STEERING APPARATUS FOR VEHICLE

BACKGROUND OF THE INVENTION

1. Field of the Invention

The present invention relates to a rear wheel steering apparatus for a vehicle, and more particularly, it relates to a steering apparatus wherein left and right rear wheels of a vehicle are steered only by hydraulic pressure.

2. Related Background Art

In the past, various kinds of rear wheel steering apparatuses for vehicles have been proposed. Generally, the rear wheel steering systems are broadly divided into the following types: a system wherein rear wheels are steered by the steering force of front wheels transmitted to the rear wheels through a steering rod and the like, a system wherein the rear wheels are steered by the combination of the steering force of the front wheels transmitted to the rear wheels and the assist of hydraulic or mechanical power, and a system wherein the rear wheels are steered only by the hydraulic or mechanical power.

Among them, the system of the type last mentioned has an advantage over the other systems in that it has a greater degree of freedom in the control of the rear wheel steering so that the rear wheels can be steered even when the steering angle of the front wheels is zero. Further, among the systems of this kind, the system wherein the rear wheels are steered only by the hydraulic force or power generally comprises a hydraulic cylinder for steering the rear wheels by axially displacing a steering rod associated with the left and right rear wheels, and a control valve for controlling the supply and discharge of oil with respect to the hydraulic cylinder. An example of the system wherein the rear wheels are steered only by the mechanical force is disclosed in the Japanese Patent Laid-Open No. 57-44568.

Systems for steering rear wheels by hydraulic power alone have been characterized by various disadvantages and problems such as those addressed in the following discussion.

Firstly, in some systems, a centering spring is provided for returning the steering rod to a neutral position in order to return the steering angle to zero if a malfunction occurs. A centering spring cancelling mechanism is also provided for preventing a biasing force of the centering spring from acting on the steering rod during the normal operation. However, in this case, since all of the hydraulic cylinder, centering spring and centering spring cancelling mechanism are disposed on the steering rod, the steering rod must be longer, thus leading to a problem that the rear wheel steering apparatus is made large-sized.

Secondly, since there is provided a system for varying or changing a hydraulic pressure, i.e., main pressure fed from a hydraulic pump to the control valve to maintain a constant differential value between the main pressure and a negative pressure in order to cope with the variation in load for the rear steering operation during the running of the vehicle, the hydraulic circuit is made complicated.

Thirdly, since a feedback control is generally effected to monitor whether the rear wheels are steered in the controlled manner, a rear wheel steering angle detection sensor is provided for detecting the steering angle of the rear wheels on the basis of the axial displacement of the steering rod. However, in order to ensure the security, it is necessary to detect abnormality in the rear wheel steering hydraulic system early.

Fourthly, in the rear wheel steering apparatus of the relevant type and wherein the biasing force of the centering spring is always applied to the steering rod to return the steering rod to the neutral position if the malfunction of the hydraulic driving device occurs, there arose a problem that, when the rear wheel steering apparatus was driven, it was necessary to provide a force opposing to the biasing force of the centering spring, as well as a force required for steering the rear wheels. Further, there also arose a problem that, when the steering rod was displaced axially, the rod was struck against spring holders for the centering spring, thus generating noise.

Fifthly, in the aforementioned rear wheel steering apparatus, the rear wheels are steered by displacing the steering rod axially by controlling the pressure in the hydraulic cylinder of the rear wheel steering mechanism by means of a spool valve mechanism. Normally, the spool valve mechanism for shifting the steering rod is controlled by an attraction force of a solenoid or a pilot pressure, and a signal from a position sensor (disposed on the steering rod) for detecting the position of the steering rod is fed back to a controller for controlling the solenoid and the like, in order to shift the steering rod to a target position.

However, since there is no check whether the spool valve mechanism is being operated surely in response to the energization of the solenoid, for example, during the running of the vehicle, it is feared that the spool valve may be shifted wilfully even during the OFF condition of the solenoid, thereby displacing the steering rod, thus involving serious risk.

Sixthly, in the rear wheel steering apparatus of the type wherein the displacement of the steering rod is controlled by the spool valve incorporated in the hydraulic driving device, the spool valve is shifted to a predetermined position by the combination of the attraction force of the solenoid disposed in the hydraulic driving device and the biasing force of the centering spring tending to return the spool valve to the neutral position, thereby controlling the supply of the pressurized oil to the rear wheel steering apparatus to control the displacement of the steering rod.

However, because a space in which the solenoid is arranged is limited and the solenoid generates heat during the energization thereof, the rating of the solenoid cannot be high and the attraction force thereof is therefore limited. As a result, the driving force for the spool is small, thus leading to unstable operation of the spool.

Further, it is necessary to provide an adjusting means for adjusting for the irregularity in the attraction force of the solenoid and the irregularity in the biasing force of the centering spring, thus increasing the number of parts and making the hydraulic driving device complicated.

Seventhly, in the rear wheel steering apparatus of the type wherein the pressurized oil is supplied to the cylinder of the apparatus by controlling the operation of the spool valve by means of the solenoid and the like, in some cases, a centering mechanism such as a spring mechanism is provided for maintaining the steering rod in the neutral position when the driving force does not act on the rod.

In addition, various fail-safe mechanisms should be provided. When such a fail-safe mechanism is operated, the steering rod is returned to its neutral position by driving the centering mechanism.

The conventional fail-safe mechanism is generally of the type wherein the pressurized oil supplied from a hydraulic pump is relieved in a tank so as not to supply the oil to a control valve of the hydraulic cylinder. However, in the high pressure oil control utilizing an accumulator, since the fail-safe mechanism is not operated until the high pressure accumulated in a long oil line and in the accumulator is completely diminished, the desired fail-safe condition is not achieved as quickly as is desirable.

Eighthly, in the rear wheel steering apparatus of the type wherein the supply of the pressurized oil from the spool valve mechanism to the rear wheel steering apparatus is controlled by supplying the pressurized oil from a pressurized oil source to the spool valve mechanism through a supply line and by shifting the spool valve by means of the solenoid and the like, in order to shift the spool valve and the steering rod of the rear wheel steering apparatus quickly, an accumulator is often arranged in the supply line to supply high pressure oil to the cylinder chamber of the rear wheel steering apparatus.

However, if the oil pressure actually supplied to the cylinder chambers of the spool valve mechanism and the rear wheel steering apparatus is lower than the desired oil pressure, it will be hard to shift the spool valve and the steering rod quickly.

The control of the shifting of the spool valve and the steering rod with the high pressure oil has an advantage that the valve and the rod can be shifted quickly, but has a disadvantage that the control will be difficult when the oil pressure is decreased.

SUMMARY OF THE INVENTION

The present invention aims to eliminate the above-mentioned conventional drawbacks, and a first object of the present invention is to provide a rear wheel steering apparatus wherein a hydraulic cylinder, a centering spring and a centering spring cancelling mechanism are arranged on a steering rod in such a manner as to make the apparatus compact.

In order to achieve the above object, according to a first aspect of the present invention, there is provided a rear wheel steering apparatus for a vehicle, comprising a hydraulic cylinder for displacing a steering rod connected to left and right rear wheels axially, a centering spring for biasing the steering rod toward a neutral position, and a centering spring cancelling mechanism for preventing a biasing force of the centering spring from acting on the steering rod and wherein a partition wall defining an oil chamber in the hydraulic cylinder is formed as a cup shape having a central concave portion which constitutes a pressure chamber of the centering spring cancelling mechanism.

According to the rear wheel steering apparatus for the vehicle in accordance with the first aspect of the present invention, since the partition wall defining the oil chamber in the hydraulic cylinder is formed as the cup shape having the central concave portion which constitutes the pressure chamber of the centering spring cancelling mechanism, the hydraulic cylinder and the centering spring cancelling mechanism can be brought more closely together along an axial direction of the steering rod, thus shortening the total axial length of the assembly to make the apparatus more small-sized.

Further, the present invention is realized in consideration of the fact that the difference in loads is small during the steering of the rear wheels. Accordingly, a second object of the present invention is to provide a rear wheel steering apparatus which can simplify a hydraulic circuit used therewith and improve the response of the rear wheel steering in a low load condition.

In order to achieve the above object, according to a second aspect of the present invention, there is provided a rear wheel steering apparatus for a vehicle, comprising a hydraulic cylinder for displacing a steering rod connected to left and right rear wheels axially, and a control valve for controlling the supply and discharge of oil with respect to the hydraulic cylinder and wherein the steering rod is displaced by a hydraulic pressure alone, and wherein a pressure control valve is disposed upstream from the control valve to maintain a main pressure constant by balancing with the main pressure alone.

According to the rear wheel steering apparatus for the vehicle in accordance with the second aspect of the present invention, by adopting a simple arrangement wherein the pressure control valve is disposed upstream from the control valve to maintain the main pressure constant, it is possible to improve the response of the rear wheel steering by using the higher hydraulic pressure in a low load condition, while maintaining a hydraulic pressure required for the rear wheel steering in a high load condition.

A third object of the present invention is to provide a rear wheel steering apparatus which can enhance the security by detecting abnormality in a hydraulic system for the rear wheel steering early.

In order to achieve the above object, according to a third aspect of the present invention, there is provided a rear wheel steering apparatus for a vehicle, comprising a hydraulic cylinder for displacing a steering rod connected to left and right rear wheels axially, and a control valve for controlling the supply and discharge of oil with respect to the hydraulic cylinder and wherein left and right rear wheels are steered by displacing the steering rod with hydraulic pressure alone, and further comprising a pressure sensor for detecting a main pressure, a control valve sensor for detecting an operating condition of the control valve, a rear wheel steering angle sensor for detecting a rear wheel steering angle on the basis of an axial displacement of the steering rod, and a fail-safe discrimination control means for initiating a fail-safe operation on the basis of signals from the above three sensors, thus stopping the control of the rear wheel steering.

According to the third aspect of the present invention, since the main pressure, the operating condition of the control valve and the rear wheel steering angle are monitored and detected by the pressure sensor, control valve sensor and rear wheel steering angle sensor, respectively, it is possible to find an abnormality early and reliably. Further, when the abnormality is found, by stopping the control of the rear wheel steering by means of the fail-safe discrimination control means, the security can be enhanced.

A fourth object of the present invention is to provide a hydraulic pressure supplying system for a rear wheel steering apparatus, which can shift a steering rod axially with a smaller force by preventing a biasing force of a centering spring from acting on the steering rod when the latter is shifted axially to steer rear wheels.

In order to achieve the above object, according to a fourth aspect of the present invention, there is provided a hydraulic pressure supplying system for a rear wheel steering apparatus, comprising a rear wheel steering mechanism (271) including a steering rod (180) shiftable axially to steer rear wheels, a housing (112) for supporting the steering rod for axial movement, a cylinder chamber (192) formed around the steering rod, and a piston (184) disposed on the steering rod for sliding movement within the cylinder chamber and adapted to divide the cylinder chamber into first and second cylinder chambers (194, 195); a spool valve mechanism (248) for supplying pressurized oil from a pressurized oil source to either the first cylinder chamber or the second cylinder chamber to steer the rear wheels, thereby shifting the steering rod axially; and a centering mechanism (272) including two annular portions (222, 223) protruding radially from the steering rod, two spring holders (224, 225) disposed between the annular portions and capable of being abutted against the annular portions, a spring chamber (212) formed between the two spring holders, a spring means (226) disposed in the spring chamber and adapted to bias the spring holders toward the annular portions, limiting means (227, 201) formed on the housing and adapted to limit the movements of the spring holders by abutting against the spring holders, and two pressure chambers (215, 202) disposed at sides opposing to the spring means for the spring holders, respectively, and communicated with the pressure oil source (250). The centering mechanism releases the abutment between the spring holders and the annular portions in opposition to a biasing force of the spring means by supplying the pressurized oil from the pressurized oil source to the pressure chambers, thereby preventing the biasing force of the spring means from acting on the steering rod in a normal condition. In an abnormal condition, the centering mechanism maintains the steering rod in a neutral position by abutting the spring holders against the limiting means due to the biasing force of the spring means by reducing the pressure difference between the pressure chambers and the spring chamber.

According to the hydraulic pressure supplying system for the rear wheel steering apparatus in accordance with the fourth aspect of the present invention, since the abutment between the spring holders and the annular portions is released in opposition to the biasing force of the spring means by supplying the pressurized oil from the pressurized oil source to the pressure chambers of the centering mechanism, when the spool valve mechanism shifts the steering rod axially to steer the rear wheels by supplying the pressurized oil from the pressurized oil source to either the first cylinder chamber or the second cylinder chamber, the biasing force of the spring means can be prevented from acting on the steering rod, whereby the steering rod can be shifted axially with the smaller force.

In accordance with the fourth aspect of the present invention, when the spool valve mechanism shifts the steering rod axially to steer the rear wheels by supplying the pressurized oil from the pressurized oil source to either the first cylinder chamber or the second cylinder chamber, the abutment between the spring holders and the annular portions is released in opposition to the biasing force of the spring means by supplying the pressurized oil from the pressurized oil source to the pressure chambers of the centering mechanism. As a result, since the biasing force of the spring means (centering spring) does not act on the steering rod, it is possible to shift the steering rod with smaller force. Accordingly, in a normal control condition, the control of the spool valve mechanism can be effected smoothly.

Further, when the shifting direction of the steering rod is changed, since the spring holders for the centering spring do not strike against the steering rod, noise is not generated. In addition, in the abnormal condition, since the spring holders are abutted against the limiting means due to the biasing force of the spring means by reducing the pressure difference between the pressure chambers and the spring chamber, it is possible to maintain the steering rod in the neutral position.

A fifth object of the present invention is to provide a hydraulic pressure supplying system for a rear wheel steering apparatus, which can always monitor a movement of a spool valve to avoid the risk which would be involved when the spool valve is shifted wilfully during the deenergized state of a solenoid.

In order to achieve the above object, according to a fifth aspect of the present invention, there is provided a hydraulic pressure supplying system for a rear wheel steering apparatus, comprising a rear wheel steering mechanism (271) including a steering rod (180) shiftable axially to steer rear wheels, a housing (112) for supporting the steering rod for axial movement, a cylinder chamber (192) formed around the steering rod, and a piston (184) disposed on the steering rod for sliding movement within the cylinder chamber and adapted to divide the cylinder chamber into first and second cylinder chambers (194, 195); a spool valve mechanism (248) for supplying a pressurized oil from a pressurized oil source to either the first cylinder chamber or the second cylinder chamber to steer the rear wheels by shifting a spool valve (160), thereby shifting the steering rod axially; a shifting amount detecting means (169) for detecting an axial shifting amount of the spool valve and outputting a position signal; a control means for comparing the position signal and a reference signal for the spool valve and outputting an abnormality signal when it is judged that the spool valve is shifted abnormally; and a fail-safe mechanism (249) for returning the steering rod to its neutral position by equalizing the pressure in the first cylinder chamber with the pressure in the second cylinder chamber when it receives the abnormality signal from the control means.

According to the hydraulic pressure supplying system for the rear wheel steering apparatus in accordance with the fifth aspect of the present invention, a fail-safe mode wherein the steering rod is returned to the neutral position when it is judged that the spool valve is shifted abnormally by monitoring the movement of the spool valve can be selected.

According to the present invention, since the shifting amount of the spool valve is always monitored, the abnormality of the rear wheel steering mechanism can be detected early to select the fail-safe mode for returning the steering rod to the neutral position, thus enhancing the response of the rear wheel steering and avoiding the occurrence of the dangerous condition during the running of the vehicle.

A sixth object of the present invention is to provide a hydraulic driving device for a rear wheel steering apparatus, which can control the movement of a steering rod by a solenoid without increasing the rating of the solenoid.

In order to achieve the above object, according to a sixth aspect of the present invention, there is provided a hydraulic driving device for a rear wheel steering apparatus, comprising a rear wheel steering mechanism including first and second cylinder chambers (194, 195), and a steering rod (180) axially shifted by a hydraulic pressure applied to either first or second cylinder chamber; a spool valve mechanism including a first passage (197) for communicating a hydraulic pressure supply circuit (252) or a return circuit (254) with the first cylinder chamber and a second passage (198) for communicating the hydraulic pressure supply circuit or the return circuit with the second cylinder chamber, third and fourth cylinder chambers (172, 182), a spool (160) for closing or opening the first or second passage by being shifted axially by a hydraulic pressure applied to the third or fourth cylinder chamber, and a first biasing member (173) for biasing the spool toward one direction and a second biasing member (183) for biasing the spool toward an opposite direction; a first pilot pressure generating means including a fifth cylinder chamber (124) communicated with a hydraulic pressure source and a sixth cylinder chamber (125) communicated with the third cylinder chamber, a first fixed restriction (142) disposed between the sixth cylinder chamber and the hydraulic pressure source, a first rod member (123) shiftable axially within the fifth or sixth cylinder chamber, and a first solenoid (120) for driving the first rod member axially; and a second pilot pressure generating means including a seventh cylinder chamber (134) (not shown) communicated with the hydraulic pressure source and an eighth cylinder chamber (135) communicated with the fourth cylinder chamber, a second fixed restriction (152) disposed between the eighth cylinder chamber and the hydraulic pressure source, a second rod member (133) shiftable axially within the seventh or eighth cylinder chamber, and a second solenoid (130) for driving the second rod member axially.

In operation, the spool valve is switched by applying the pilot pressure from the sixth or eighth cylinder chamber to the third or fourth cylinder chamber by generating a pressure at the first or second fixed restriction by driving the first or second member by energizing the first or second solenoid.

According to the sixth aspect of the present invention, it is possible to generate the pilot pressure proportional to a current value of the solenoid. The pilot pressure is determined by a cross-sectional area of a rod pin of the solenoid and an attraction force of the solenoid, and, since the pilot pressure is not affected by the irregularity in the biasing force of the centering spring for holding the spool in its neutral position, it is possible to obtain the hydraulic driving device, regardless of the irregularity in the biasing force of the centering spring.

Further, since the operational force for the spool is great, it is possible to switch the spool valve stably to increase the driving force for the steering rod, thus avoiding the poor operation and/or the irregularity in the properties effectively.

A seventh object of the present invention is to provide a pressurized oil supplying device which can shorten a time period from the onset of an abnormality to the start of an operation of a fail-safe mechanism.

In order to achieve the above object, according to a seventh aspect of the present invention, there is provided a pressurized oil supplying device comprising a rear wheel steering mechanism (271) including first and second cylinder chambers (194, 195), and a steering rod (180) shifted axially by a hydraulic pressure applied to either first or second cylinder chamber to steer rear wheels; a spool valve mechanism (248) which can be switched to supply liquid to the first or second cylinder chamber; a centering mechanism (272) for holding the steering rod in its neutral position; and a fail-safe mechanism (249) for preventing a shifting movement of the steering rod by equalizing a pressure in the first cylinder chamber with a pressure in the second cylinder chamber and by making the rear wheel steering mechanism inoperative when the abnormality occurs.

More specifically, the centering mechanism preferably comprises a pair of shiftable members (224, 225) shiftably mounted on the steering rod, a biasing member (226) for biasing the shiftable members away from each other to abut them against engagement portions (222, 223) formed on the steering rod, and first (212) and second (202, 215) chambers which are formed between the shiftable members and at the outsides of the shiftable members, respectively, and to which the hydraulic liquid can be supplied.

Further, the fail-safe mechanism comprises first and second passages (207, 208) communicated with the first and second cylinder chambers, respectively, third and fourth passages (206, 245) communicated with the first and second spaces of the centering mechanism, respectively, and a control member (235) for equalizing the pressures in the first and second passages and the pressures in the third and fourth passages.

According to the seventh aspect of the present invention, upon the occurrence of an abnormality, the control member of the fail-safe mechanism is operated so that the pressures in the cylinder chambers of the rear wheel steering mechanism are equalized and at the same time the pressures in the spaces of the centering mechanism are equalized. As a result, the steering rod is not subjected to a driving force form either direction and the operation of the centering mechanism is permitted. Thus, even when the pressurized oil supplying device includes an accumulator, the fail-safe mechanism can reach the fail-safe mode for a short time, thus returning the rear wheels to a straight travelling condition.

An eighth object of the present invention is to provide an improved pressurized oil supplying device which can select a fail-safe mode when hydraulic pressures applied to cylinder chambers to drive a spool valve and a steering rod are decreased below a predetermined value.

In order to achieve the above object, according to an eighth aspect of the present invention, there is provided a pressurized oil supplying device comprising a rear wheel steering mechanism (271) including first and second cylinder chambers (194, 195), and a steering rod (180) shifted axially by a hydraulic pressure applied to either first or second cylinder chamber to steer rear wheels; a spool valve mechanism (248) including third and fourth cylinder chambers (172, 182) to which pressurized oil is supplied from a hydraulic pressure source via a pressurized oil supply line (252), and a spool valve (160) shifted axially by a hydraulic pressure applied to either the third or fourth cylinder chamber to control the supply of a pressurized oil to the first or second cylinder chamber; a sensor (262) provided in the pressurized oil supply line for detecting a supply pressure of the pressurized oil; and a fail-safe mechanism (249) for equalizing a pressure in the first cylinder chamber with a pressure in the second cylinder chamber to return the steering rod to its neutral position when the sensor detects the fact that the hydraulic pressure in the pressurized oil supply line is decreased below a predetermined value.

According to the eighth aspect of the present invention, in the pressurized oil supplying device wherein the spool valve of the spool valve mechanism (148) and the steering rod of the rear wheel steering mechanism (272) are driven by the high pressure oil, when the sensor (262) detects the fact that the pressure having a predetermined value is not applied to the cylinder chambers (172, 182; 194, 195), the fail-safe mechanism (249) is operated to return the steering rod to the neutral position. Accordingly, it is possible to drive the spool valve and the steering rod quickly with the high hydraulic pressure, and to surely prevent the control of the steering rod and accordingly the rear wheels from being made difficult.

BRIEF DESCRIPTION OF THE DRAWINGS

FIG. 1 is a block diagram of a steering system for a vehicle, FIG. 2 is an elevational sectional view of a rear wheel steering mechanism and FIG. 3 is a flow chart showing a control sequence for discriminating a malfunction or abnormality;

DETAILED DESCRIPTION OF THE PREFERRED EMBODIMENTS

The present invention will now be explained in connection with embodiments thereof with reference to the accompanying drawings.

Figure 1:
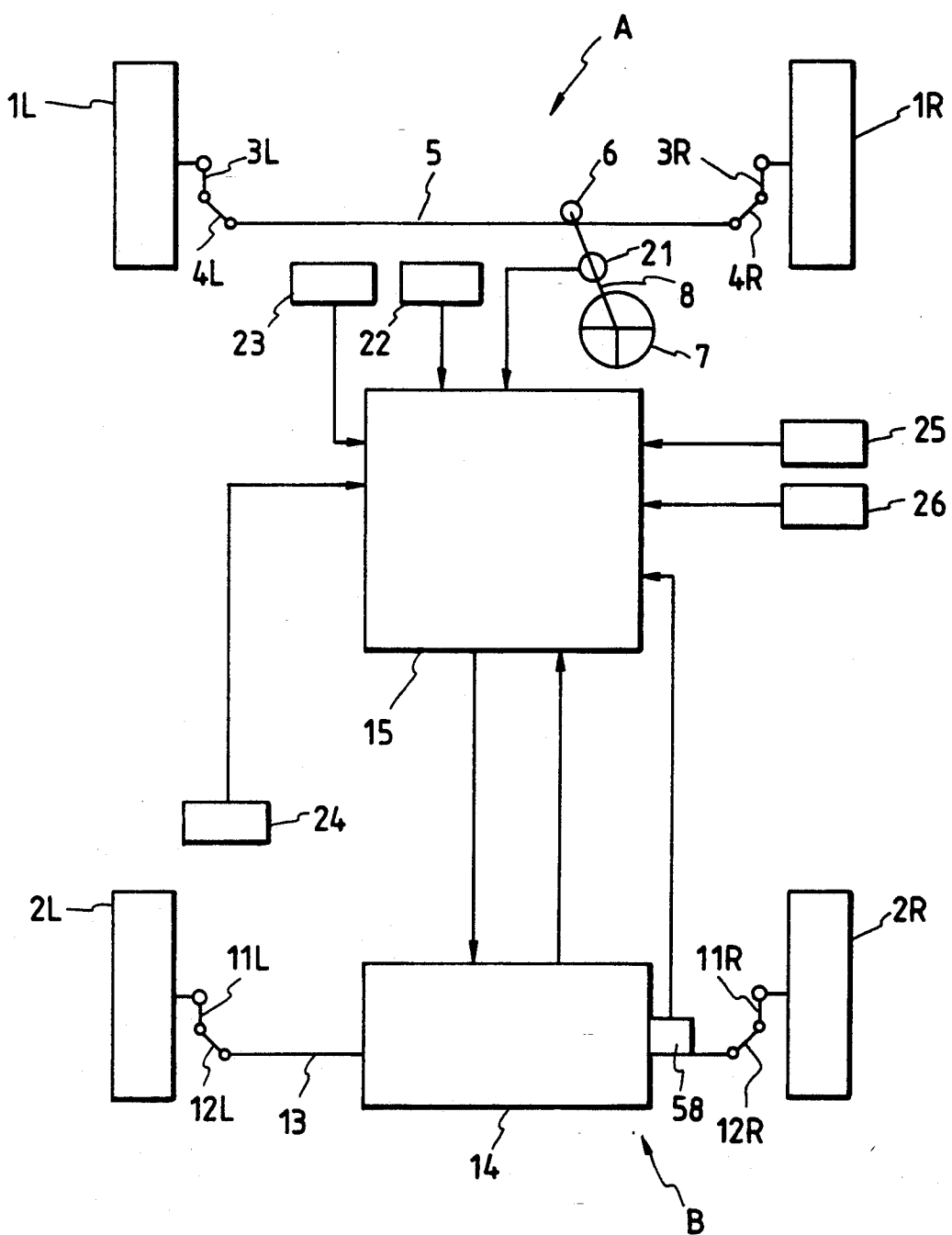
FIGS. 1 to 3 show a preferred embodiment of the present invention, where

FIG. 1 shows the general layout of a steering system including a rear wheel steering apparatus for a vehicle according to a preferred embodiment of the present invention. The steering system comprises a front wheel steering apparatus A for steering left and right front wheels 1L, 1R, and a rear wheel steering apparatus B for steering left and right rear wheels 2L, 2R.

The front wheel steering apparatus A comprises a pair of knuckle arms 3L, 3R and a pair of left and right tie rods 4L, 4R, a relay rod 5 connecting the left and right tie rods 4L, 4R, and a steering shaft 8 having a pinion 6 meshed with a rack (not shown) formed on the relay rod 5 at its one end and a steering wheel 7 at its the other end. By manipulating the steering wheel 7, the relay rod 5 is displaced in a transverse direction of a vehicle to steer the front wheels.

The rear wheel steering apparatus B comprises a pair of knuckle arms 11L, 11R and a pair of left and right tie rods 12L, 12R, a rear wheel steering mechanism 14 for displacing a relay rod (steering rod) 13 connecting the left and right tie rods 12L, 12R in its axial direction (i.e., the transverse direction of the vehicle) to steer the left and right rear wheels 2L, 2R, and a control unit 15 constituting a control portion for controlling the rear wheel steering mechanism 14 (more specifically, switching opening/closing valves 52, 53 and/or a fail-safe valve 81 as will be described later).

In the form shown, reference numeral 21 denotes a steering wheel steering angle sensor for detecting a steering angle of the steering wheel; 22 denotes a vehicle velocity sensor for detecting a velocity of the vehicle; 23 and 24 denote lateral acceleration sensors for detecting lateral accelerations of front and rear parts of a vehicle body, respectively; 25 denotes a brake switch; and 26 denotes an acceleration pedal switch. Signals from the sensors 21-24 and switches 25, 26 are inputted to the control unit 15. Further, signals from various sensors (more specifically, a pressure sensor 44, control valve sensor 56 and rear wheel steering angle sensor 58 as will be described later) of the rear wheel steering mechanism 14 are also inputted to the control unit 15.

Figure 2:
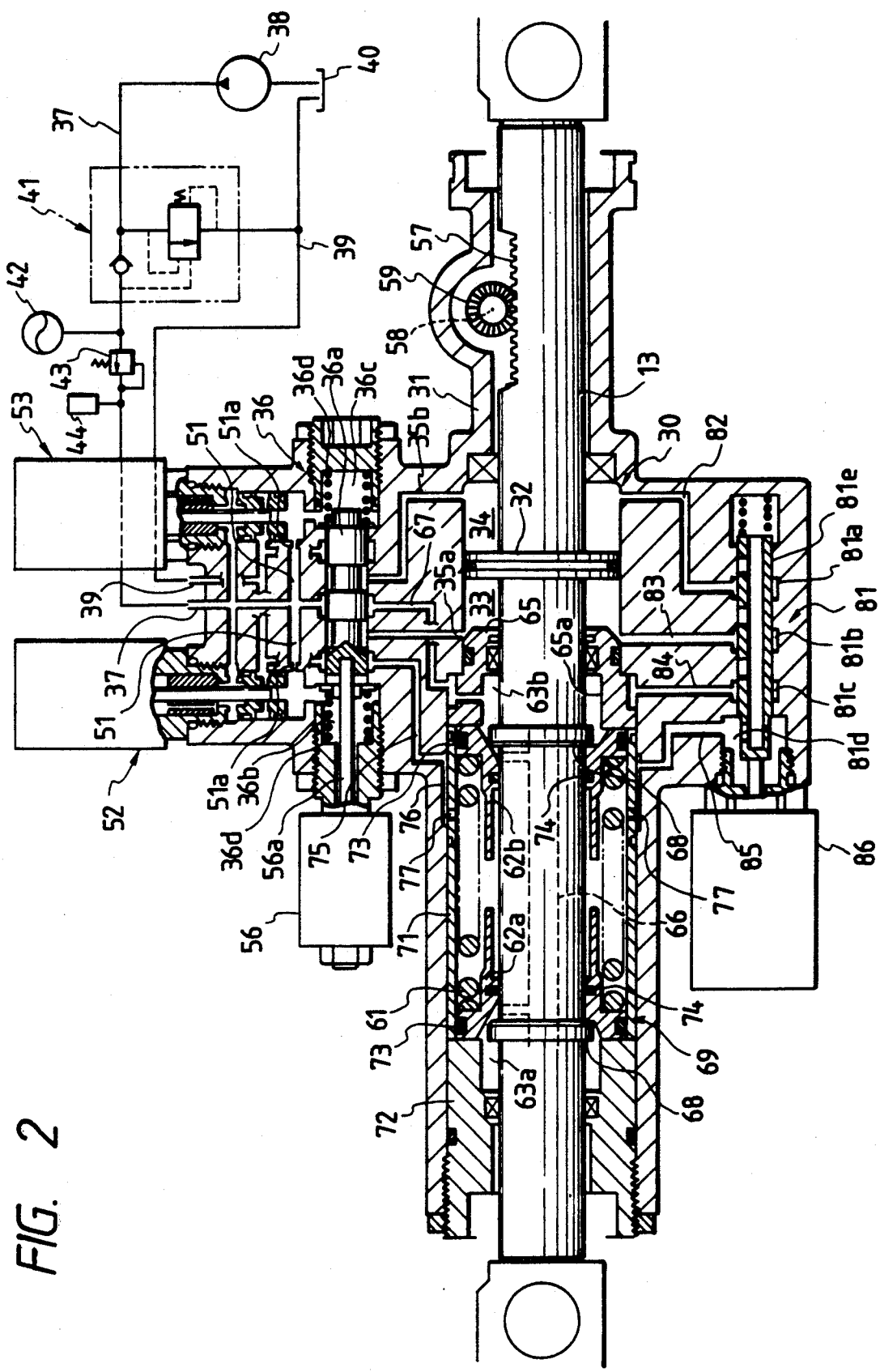

The rear wheel steering mechanism 14 utilizes a hydraulic pressure for driving power and the construction thereof is shown in FIG. 2.

In FIG. 2, a hydraulic cylinder 30 utilizing the relay rod 13 as a piston rod has a left steering hydraulic pressure chamber 33 and a right steering hydraulic pressure chamber 34 formed in a housing 31 and divided by a piston 32 secured to the relay rod 13, and these hydraulic pressure chambers 33, 34 are communicated with a control valve 36 via oil lines 35a, 35b, respectively. The control valve 36 is communicated with a hydraulic pump 38 via a supply line 37 and is also communicated with an oil tank 40 via a drain line 39. An accumulator 42 and a relief valve 41 for regulating an upper limit value of a discharge pressure of the hydraulic pump 38 are disposed in the supply line 37, and a hydraulic pressure discharged from the hydraulic pump 38 is accumulated in the accumulator 42 temporarily and then is supplied from the accumulator 42 to the control valve 36. The hydraulic pressure supplied from the accumulator 42 to the control valve 36 is referred to as "main pressure" hereinafter.

Further, at a downstream side of the accumulator 42 in the supply line 37, there is disposed a pressure control valve 43 for maintaining the main pressure constant by balancing with the main pressure alone, and the constant value of the main pressure is set to a minimum pressure required for steering the rear wheels 2L, 2R in a high load condition. Further, a pressure sensor 44 for detecting the main pressure at a downstream side of the pressure control valve 43 is disposed in the supply line 37, and main pressure information detected by the pressure sensor 44 is inputted to the control unit 15 (FIG. 1).

The control valve 36 has a pair of pilot chambers 36b, 36c at both sides of a spool 36a, and springs 36d are disposed in the pilot chambers 36b, 36c. Further, the pilot chambers 36b, 36c are communicated with the supply line 37 via pilot passages 51 having fixed restrictions 51a, so that the main pressure is decreased by the fixed restrictions 51a to send to the control valve as a pilot pressure. The pilot chambers also can be communicated with the drain line 39 via opening/closing valves 52, 53 having variable restrictions.

The opening/closing switching of the opening/closing valves 52, 53 is controlled by the control unit 15 (FIG. 1), and the following operations can be effected by the opening/closing switching of the opening/closing valves. For example, as shown in FIG. 2, in a condition that the spool 36a of the control valve 36 is in its neutral position, when the opening/closing valve 52 is closed and the other opening/closing valve 53 is opened to communicate the pilot chamber 36c with the drain line 37 (i.e., when the pilot pressure is relieved), the spool 36a is shifted to the right in FIG. 2 to communicate the oil passages 35a, 35b with the supply line 37 and the drain line 39, respectively. Consequently, the pressurized oil is supplied to the left steering hydraulic chamber 33 and the pressurized oil is drained from the right steering hydraulic chamber 34, thus displacing the relay rod 13 to the right, with the result that the left and right rear wheels 2L, 2R are steered to direct leftwardly with respect to the travelling direction (FIG. 1) of the vehicle. Conversely, when the opening/closing valve 53 is closed and the opening/closing valve 52 is opened to communicate the pilot chamber 36b with the drain line 37, the spool 36a is shifted to the left in FIG. 2 to communicate the oil passages 35b, 35a with the supply line 37 and the drain line 39, respectively. Consequently, the pressurized oil is supplied to the right steering hydraulic chamber 34 and the pressurized oil is drained from the left steering hydraulic chamber 33, thus displacing the relay rod 13 to the left, with the result that the left and right rear wheels 2L, 2R are steered to direct rightwardly.

A rod 56a of a control valve sensor 56 for detecting an operating condition of the control valve 36 is connected to the spool 36a of the control valve 36, and operation information of the control valve 36 detected by the sensor 56 is inputted to the control unit 15 (FIG. 1). Further, a gear portion 57 formed on the relay rod 13 is meshed with a pinion 59 connected to a rear wheel steering angle sensor 58. The wheel steering angle sensor 58 detects a rear wheel steering angle on the basis of an axial shifting amount of the relay rod 13, and the rear wheel steering angle information is also inputted to the control unit 15.

A centering spring 61 is disposed around the relay rod 13 adjacent to the left side of the hydraulic cylinder 30 to return the rear wheel steering angle to zero by returning the relay rod 13 to its neutral position upon the occurrence of a malfunction or abnormality. Both ends of the centering spring 61 are supported by a pair of centering spring cancelling pistons 62a, 62b slidably mounted on the relay rod 13, and centering spring cancelling pressure chambers 63a, 63b are formed axially outwardly (at back surface opposing to spring seat supporting surfaces) of the pistons 62a, 62b.

A partition wall 65 defining the hydraulic chamber 33 of the hydraulic cylinder 30 comprises a cup-shaped member formed independently from the housing 31, and a central concave portion 65a of the partition wall forms the centering spring cancelling pressure chamber 63b opposing the back surface of the piston 62b. The pressure chamber 63b is communicated with the other centering spring cancelling pressure chamber 63a via an oil passage 66 formed in the relay rod 13 and the main pressure in the supply line 37 is always supplied to the pressure chambers 63a, via an oil passage 67. The main pressure supplied to the pressure chambers 63a, 63b compresses the centering spring 61 and disengages the pistons 62a, 62b from stoppers 68 formed on the relay rod 13, thereby cancelling the function of the centering spring 61 for returning the relay rod 13 to its neutral position. The pistons 62a, 62b and the pressure chambers 63a, 63b constitute a centering spring cancelling mechanism 69.

The centering spring 61 is arranged within a cylindrical collar member 71 and is housed in the housing 31 together with the collar member 71. One end of the collar member 71 supports the partition wall 65 and the other end of the collar member is supported by a side guide member 72 secured to the housing 31. Seal-ring members 73 are disposed on outer peripheral surfaces of the pistons 62a, 62b, respectively, to seal against an inner peripheral surface of the collar member 71. Similarly, seal-ring members 74 are disposed on inner surfaces of the pistons 62a, 62b, respectively, to seal against an outer peripheral surface of the relay rod 13. An annular recess 76 forming a part of an oil passage 75 communicating with the drain line 39 is defined between an inner peripheral surface of the housing 31 and an outer peripheral surface of the collar member 71, and the collar member 71 is provided with a plurality of communication holes 77 which are equidistantly arranged along the circumference of the collar member and communicate the annular recess 76 with the interior of the collar member (containing the centering spring 61).

A fail-safe valve 81 has a port 81a communicated with the right steering hydraulic chamber 34 via an oil passage 82, a port 81b communicated with the left steering hydraulic chamber 33 via an oil passage 83, a port 81c communicated with the centering spring cancelling pressure chamber 63b via an oil passage 84, and a port 81d communicated with the drain line 39 via oil passages 85, 75. A spool 81e of the fail-safe valve 81 can be switched by a solenoid 86, between an open position where all of the four ports 81a–81d are communicated with each other and a closed position where the communications of the ports are blocked. The switching of the fail-safe valve 81 is effected under the control of the control unit 15, so that, when a malfunction or abnormality in the rear wheel steering apparatus B is detected by the control unit 15, the fail-safe valve 81 is switched to the open position, thus draining the hydraulic cylinders 33, 34 of the hydraulic cylinder 30, and the centering spring cancelling pressure chambers 63a, 63b.

In the above-described construction, the hydraulic cylinder 30, centering spring 61 and centering spring cancelling mechanism 69 are arranged on the relay rod 13. Advantageously, because the partition wall 65 defining the hydraulic chamber 33 of the hydraulic cylinder 30 is formed as a cup shaped member independently from the housing 31 and because the concave portion 65a of the partition wall defines the pressure chamber 63b of the centering spring cancelling mechanism 69, the hydraulic chamber 33 of the hydraulic cylinder 30 and the pressure chamber 63b of the centering spring cancelling mechanism 69 are formed using a common member (partition wall 65), thus shortening the total length of the assembly (cylinder 30 and mechanism 69) along the axial direction (transverse direction of the vehicle) of the relay rod 13.

Further, since the centering spring 61 is disposed within the collar member 71 supporting the partition wall 65, and since the pistons 62a, 62b of the centering spring cancelling mechanism 69 are slidable with respect to the collar member 71 while being sealed against the latter by the seal-rings 73, the collar member 71 can also act as a cylinder of the centering spring cancelling mechanism 69 with good sealing ability. This reduces the number of parts, and further contributes to making the apparatus small-sized.

Additionally in the above-described construction, the oil leaking out of the pressure chambers 63a, 63b of the centering spring cancelling mechanism 69 into the collar member 71 is returned to the oil tank 40 through the communication holes 77 of the collar member 71, oil passage 75 etc., thus preventing the oil from leaking to the outside without fail.

Further, in the illustrated embodiment, by disposing the pressure control valve 43 at the downstream side of the accumulator 42 in the supply line 37 for communicating the hydraulic pump 38 with the control valve 36, the main pressure in the supply line 37 at the downstream side of the accumulator 42 will be constant, regardless of the load for steering the rear wheels. (As noted earlier, the main pressure is set to have a minimum constant value required to steering the rear wheels in the high load condition.) Thus, it is possible to ensure the hydraulic power required for steering the rear wheels even when the load for steering the rear wheels is high. Moreover, in the low load condition, since the rear wheel steering is effected quickly with the higher hydraulic power, it is possible to enhance the response feature of the rear wheel steering.

In addition, since the pressure control valve 43 has a simple construction which can maintain the main pressure constant by introducing the main pressure alone into it as the pilot pressure to balance with such pressure, it is very advantageous in practical use.

Figure 3:
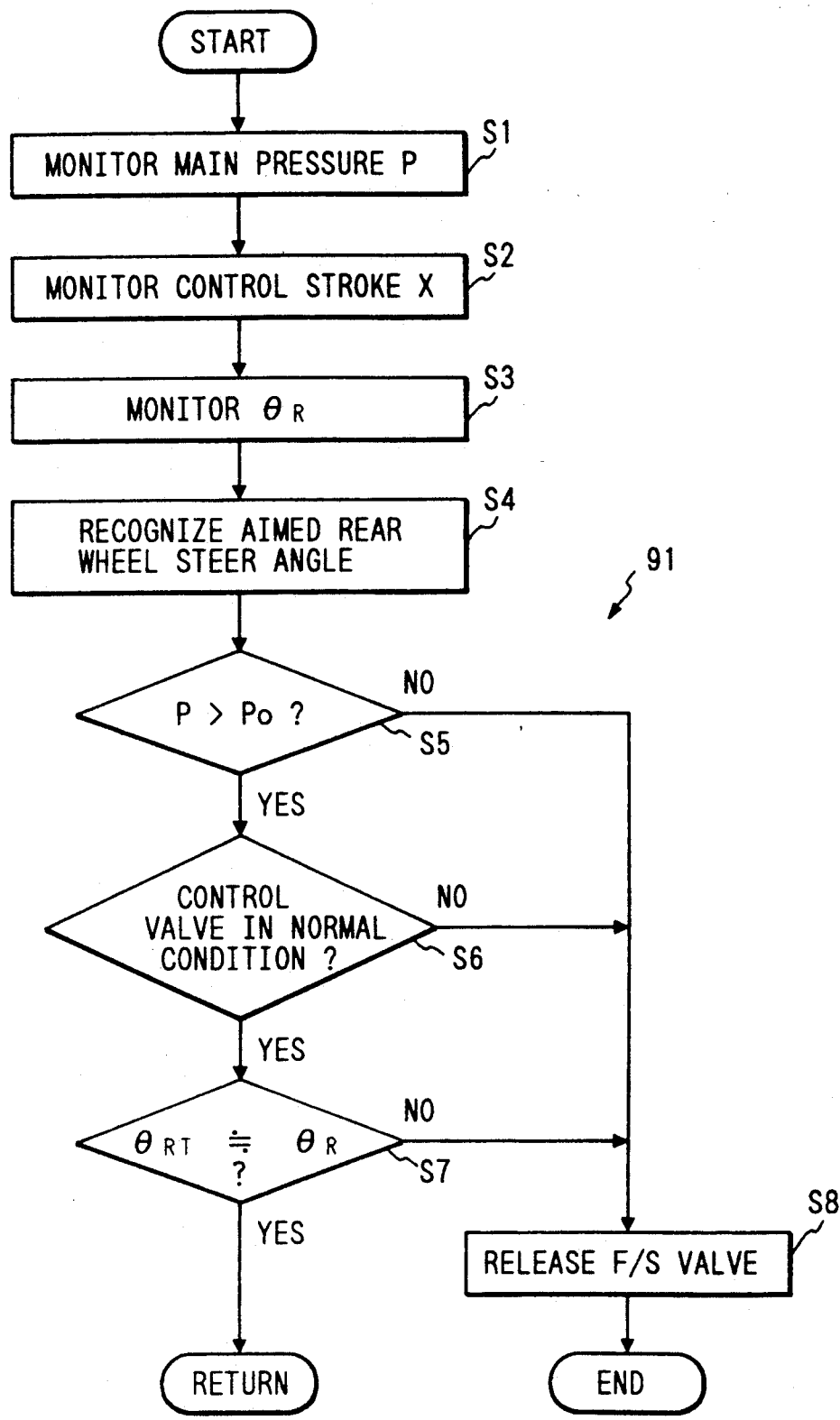

FIG. 3 shows a flow chart for a control operation carried out by the control unit 15 for judging a malfunction or abnormality.

In a step S1, the information of the main pressure P from the pressure sensor 44 is monitored, and, in a step S2, the information of a control valve stroke X from the control valve sensor 56 is monitored. In a step S3, the information of the rear wheel steering angle $\theta R$ from the rear wheel steering angle sensor 58 is monitored. Then, in a step S4, an aimed rear wheel steering angle $\theta RT$ is recognized. The aimed rear wheel steering angle $\theta RT$ is sought from an aimed rear wheel steering angle operation program independently stored in the control unit 15 on the basis of the following equation:

$$\theta RT = -K_1 \cdot \theta H + K_2 \cdot V \cdot \phi$$

Where, $\theta H$ is a steering wheel steering angle, V is a vehicle velocity, and $\phi$ is a yaw rate.

Figure 4:
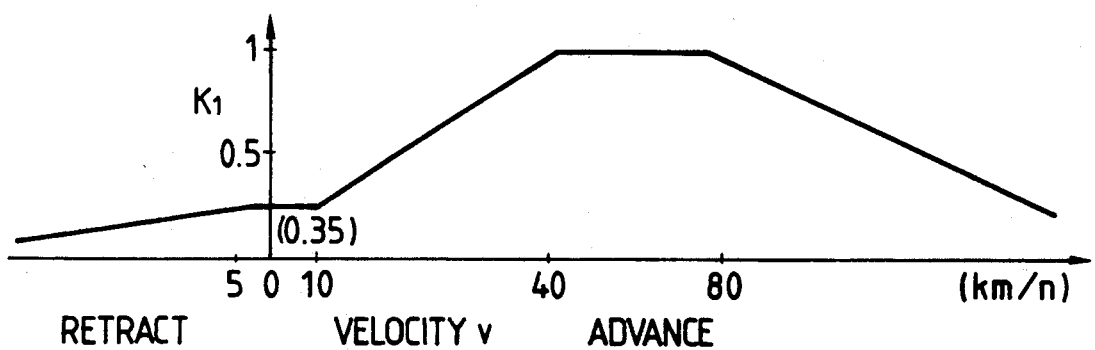
FIGS. 4 and 5 are graphs showing the variation in coefficients $K_1$ and $K_2$.

Coefficients $K_1$ and $K_2$ are variable having values depending upon the vehicle velocity, and can be determined based on characteristics of the vehicle. In one example, as shown in FIG. 4, the coefficient $K_1$ is about 0.35 until the vehicle velocity reaches about 10 Km/h, and when the vehicle velocity exceeds 10 Km/h, $K_1$ is gradually increased as the vehicle velocity increases, and becomes about 1 when the vehicle velocity reaches about 40 Km/h. When the vehicle velocity exceeds 80 Km/h, $K_1$ is gradually decreased as the vehicle velocity increases, for ensuring the stability in the straight running of the vehicle at high velocity, thus dulling the response to the change in the front wheel steering angle. Further, during the reverse running of the vehicle, below the vehicle velocity of 5 Km/h in which tight cornering is desired, $K_1$ is maintained at 0.35 or thereabout, but when the vehicle velocity exceeds 5 Km/h, $K_1$ is gradually decreased as the vehicle velocity increases, for ensuring the stability.

Figure 5:
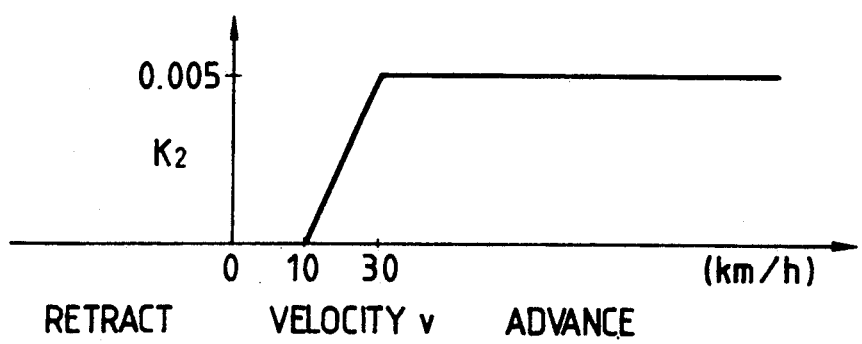

An example for the coefficient $K_2$ is shown in FIG. 5. When the vehicle velocity exceeds 10 Km/h, the coefficient $K_2$ is gradually increased and reaches 0.005 at the vehicle velocity of about 30 Km/h.

Returning to FIG. 3, in a step S5, it is judged whether the previously monitored main pressure P is above a predetermined value $P_0$. If affirmative (YES), in a step S6, it is judged, on the basis of the previously monitored control valve stroke X, whether the control valve 36 is in the normal condition determined on the basis of a switch control flow independently stored. If affirmative (YES), in a step S7, it is judged whether the aimed rear wheel steering angle $\theta RH$ is substantially equal to the previously monitored rear wheel steering angle $\theta R$. If affirmative (YES), the program goes to RETURN.

On the other hand, in any of steps S5, S6 or S7, if the negative (NO) is given (that is, when the main pressure P is lower than the predetermined value $P_0$, or when the control valve 36 is not in the normal condition or when the aimed rear wheel steering angle $\theta RH$ differs from the monitored rear wheel steering angle $\theta R$), in a step S8, the fail-safe valve 81 is switched to the open position, and thereafter, the control is ended.

The above-mentioned control flow constitutes a fail-safe discriminating means for determining the timing of the start of the fail-safe operation for the hydraulic system of the rear wheel steering apparatus B on the basis of the signals from the pressure sensor 44, control valve sensor 56 and rear wheel steering angle sensor 58, and then stopping the control of the rear wheel steering.

Since the main pressure in the hydraulic system of the rear wheel steering apparatus B is monitored and detected by the pressure sensor 44, and the operating condition of the control valve 36 is monitored and detected by the control valve sensor 56, and the rear wheel steering angle is monitored and detected by the rear wheel steering angle sensor 58 on the basis of the axial displacement of the relay rod 13, it is possible to detect a malfunction or abnormality in the hydraulic system early and reliably. For example, a delay in response of the rear wheel steering caused by the reduction in a main pressure can be early and directly found by detecting the main pressure by means of the pressure sensor 44. Further, if the spool 36a cannot be shifted due to the jamming in the control valve 36, it is possible to immediately find the malfunction on the basis of the control valve stroke information from the control valve sensor 56. Further, if the relay rod 13 cannot be shifted axially for some reason, it is possible to immediately find the malfunction on the basis of the rear wheel steering angle information from the rear wheel steering angle sensor 58. When the malfunction or abnormality is found in the hydraulic system of the rear wheel steering apparatus B, the control of the rear wheel steering is stopped by the fail-safe discriminating means, with the result that the relay rod 13 is returned to the neutral position by the biasing force of the centering spring 61, thus realizing a two-wheel steering condition in which the rear wheel steering angle is zero. Consequently, it is possible to prevent the erroneous rear wheel steering caused by the malfunction or abnormality in the hydraulic system, thus enhancing the safety.

Next, a second embodiment of the present invention will be explained with reference to FIG. 6.

Figure 6:
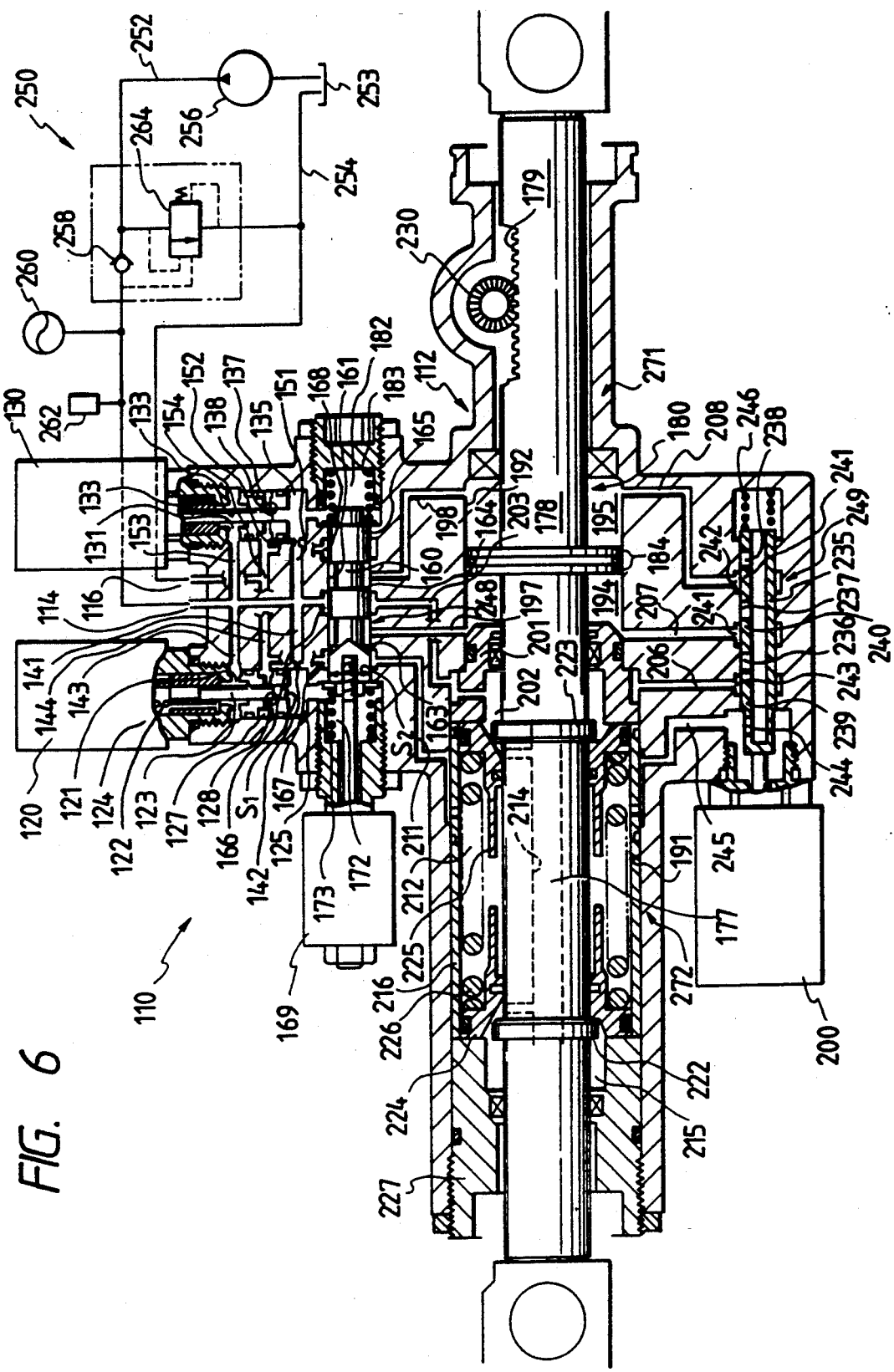
FIG. 6 is an elevational sectional view showing a second embodiment of the present invention.

In FIG. 6 there is shown a hydraulic driving device 110. At an intermediate portion of a housing 112 in its vertical direction, there are disposed a spool 160 and a steering shaft 180 in parallel with each other. A pair of solenoids 120, 130 are arranged above the spool and extend perpendicular to the spool, and a solenoid 200 is arranged below the steering shaft 180 in parallel therewith. The steering shaft 180 is connected, at its both ends, to steering rods (not shown), respectively, and rear wheels are steered in left or right direction by the axial displacement of the steering shaft. The solenoids 120, 130 serve to control the movement of the spool 160 which in turn serves to control the movement of the steering shaft 180. The solenoid 200 is used for a fail-safe operation. These will be described later.

A pressurized oil supplying device 250 for supplying pressurized oil to the hydraulic driving device 110 will now be explained. The pressurized oil supplying device includes a supply line 252 and a return line 254 for the pressurized oil, a pump 256, a check valve 258, an accumulator 260 and an oil pressure sensor 262 (which elements 256-262 are disposed in the supply line 252), and a relief valve 264 disposed between the supply line and the return line.

Pin rods 123, 133 are disposed for up-and-down movement within chambers 121, 131 formed above the housing 112 in the vicinity of the solenoids 120, 130, respectively. The pin rods 123, 133 are always biased by springs 122, 132 (spring 132 is not shown) to their neutral positions, but they can be attracted upwardly when the corresponding solenoids are energized. Chambers 124, 134 (chamber 134 is not shown) are formed above the pin rods 123, 133, respectively, and chambers 125, 135 are formed below the pin rods 123, 133, respectively. Passages 141, 151 branched from a passage 114 formed in the housing 112 and communicated with the supply line 252 are also communicated with the chambers 125, 135, respectively. Fixed restrictions 142, 152 are formed at junctions between these passages and the chambers. Similarly, passages 143, 153 branched from the passage 114 are communicated with the chambers 121, 131, respectively. The solenoids 120, 130, chambers 124, 134, chambers 125, 135, pin rods 123, 133 and variable restrictions 128, 138 constitute first or second pilot pressure generating means.

Further, passages 144, 154 branched from a passage 116 formed in the housing 112 and communicated with the return line 254 are also communicated with chambers 127, 137 and can be communicated with the chambers 125, 135 via the variable restrictions 128, 138, respectively.

The spool 160 is slidably mounted within a chamber 161 formed in the housing 112 and extending in left and right direction. Chambers 172, 182 formed on both ends of the spool 160 are communicated with the chambers 125, 135, respectively. The spool 160 has three large diameter portions 163, 164, 165 and is biased inwardly from both sides thereof by means of springs 173, 183, respectively. A shifting amount of the spool 160 is detected by a stroke sensor 169 connected thereto. The spool 160, including the large diameter portions 163-165, and entrances such as a passage 197 constitute a spool valve.

The passage 114 is communicated with a longitudinal intermediate portion of the chamber 161 via an annular port 166, and the passage 116 is also communicated with the chamber 161 via ports 167, 168 disposed on both sides of the port 166.

The steering shaft 180 is slidably mounted within a longitudinal large cavity or bore formed in the housing 112 below the chamber 161. The bore includes two chambers 191, 192 having different diameters, to which a left end portion 177 and an intermediate portion 178 of the steering shaft are opposed, respectively. A rack portion 179 meshed with an output shaft 230 of a steering shaft position sensor (not shown) is formed on the right end portion of the steering shaft 180, and flange portions 184 having a seal therebetween are formed on the intermediate portion of the steering shaft 180, which flanges divide the intermediate chamber 192 into two cylinder chambers 194, 195. Passages 197, 198 extending from the chamber 161 are communicated with the cylinder chambers 194, 195, respectively. A holder 201 is fixedly mounted within the chamber 192, and a chamber 202 formed in the holder is communicated with a passage 203 extending from the port 166.

A cylindrical member 216 is fitted in the chamber 191 with abutting against the holder 201, and a pair of annular ridges 222, 223 are formed on the left end portion 177 of the steering shaft 180 with a predetermined distance. A pair of spring holders 224, 225 are slidably mounted on the left end portion 177 of the steering shaft between the annular ridges and are biased away from each other by means of a compression spring 226 disposed between the annular spring holders. The annular ridges, spring holders, compression spring and the like constitute a centering mechanism for holding the steering shaft in its neutral position. A cover 227 for the spring holder 224 is threaded into the left end of the housing 112. The steering shaft 180, cylinder chambers 194, 195 and the centering mechanism constitute a rear wheel steering apparatus.

A passage 211 extending from the port 167 is communicated with an annular space 212 between the spring holders. The chamber 202 is communicated with a chamber 215 formed at the left of the spring holder 224 via a passage 214 formed within the steering shaft 180.

A fail-safe control member 235 is disposed within a cavity formed in the lowermost portion of the housing 112 and is connected to an output shaft of the solenoid 200. The control member 235 is generally cylindrical and has three holes 236, 237, 238 which are spaced apart from each other in an axial direction of the control member, with the result that three seal portions 239, 240, 241 are provided on the control member. Passages 207, 208 extend from the chambers 194, 195 downwardly and are opened to the cavity via ports 241', 242, respectively, and a passage 206 extending from the chamber 202 is opened to a port 243. A leftward hole 244 formed in the control member is communicated with a passage 245 extending from the annular space 212. Under the normal operation, the control member 235 is shifted to the right by the energized solenoid 200, and, when an abnormality occurs, the control member is shifted to the left by a biasing force of a spring 246.

Next, an operation of the second embodiment will be explained.

When the solenoids 120, 130 are not energized, the pin rods 123, 133 are disposed at their down positions due to the biasing forces of corresponding springs 122, 132, and the variable restrictions 128, 130 for communicating the chambers 125, 135 with the chambers 127, 137, respectively are closed. In this condition, the pressurized oil in the pressurized oil supplying device 250 is supplied from the supply line 252 to the hydraulic driving device 110, but does not flow. As a result, the pressures in the upper and lower chambers 121, 125 of the pin rod 123, the pressures in the upper and lower chambers 131, 135 of the pin rod 133, and the pressures in the left and right chambers 172, 182 of the spool 160 are the same. Accordingly, the spool 160 remains in the neutral position under the balance of the biasing forces of the springs 173, 183, so that the large diameter portions 163, 164, 165 are opposed to the ports 167, 166, 168, respectively.

Now, when the solenoid 120 is energized alone, the rod pin 123 is shifted upwardly to open the variable restriction 128, with the result that the high pressure (P) oil in the chamber 125 flows into the chamber 127. Due to this oil flow, a pressure $P_1$ smaller than the pressure P is generated at the fixed restriction 142, and a pressure $P_2$ is similarly generated at the variable restriction 128. Since the chamber 124 has no restriction and is subjected to the full high pressure P, the rod pin 123 is maintained in a condition that a value $(P_1 \times S_1 + F)$ obtained by adding the product $(P_1 \times S_1)$ of the pressure $P_1$ (at the fixed restriction 142) and the cross-sectional area $S_1$ of the pin rod 123 to the attraction force F of the solenoid 120 is balanced with the product $(P \times S_1)$ of the high pressure P (in the chamber 124) and the cross-sectional area of the rod pin 123.

Since the pressure P and the cross-sectional area $S_1$ are constant, the pilot pressure $P_1$ is determined by the attraction force F (for attracting the rod pin 123) generated by the current flowing into the solenoid 120.

Although the pressure $P_1$ at the fixed restriction 142 is applied to the chamber 172, since the opposite chamber 182 has the high pressure P, the spool 160 is shifted to the left with a driving power of $(P - P_1) \times S_2$, which is the product of the pressure difference between the high pressure P and the pilot pressure $P_1$ and the cross-sectional area $S_2$ of the spool, and is stopped at a position where the driving power is balanced with the biasing force of the spring 173. Consequently, the spool valve 248 comprising the large diameter portion 164, port 166, etc. is switched, thus shifting the steering shaft 180. That is to say, when the larger diameter portion 164 of the spool 160 leaves the port 166 to block the entrance to the passage 197, the pressurized oil is supplied from the passage 114 to the chamber 195 via the passage 198, thus shifting the steering shaft 180 to the left.

In this condition, the pressurized oil is supplied from the passage 114 to the chamber 202 through the passage 203 and then to the chamber 215 via the passage 214. In this way, the high pressure is applied to the annular chambers 202, 215 formed on both sides of the spring holders 224, 225. Since the driving power due to the pressure difference is greater than the biasing force of the spring 226, both spring holders 224, 225 are urged to each other to separate from the corresponding annular ridges 222, 223. Accordingly, the spring holders do not interfere with the shifting movement of the steering shaft 180.

On the other hand, when the other solenoid 130 is energized alone, the variable restriction 138 is opened to shift the spool 160 to the right, thus supplying the pressurized oil to the cylinder chamber 194 to shift the steering shaft 180 to the right. In this case, as mentioned above, the spring 226 does not interfere with the shifting movement of the steering shaft.

The above explanation is of the case where the hydraulic driving device is operated normally. Next, the case where an abnormality occurs in the hydraulic driving device will be explained. The abnormality may be, for example, a pressure reduction in the pressurized oil, poor shifting of the spool 160, poor shifting of the steering shaft 180 or the like. Detection is by the oil pressure sensor 262, stroke sensor 169 or the sensor (not shown) having the output shaft 230.

The stroke sensor 169 detects the axial shifting amount of the spool 160 and generates a signal. The control unit compares this signal with a reference signal representative of the desired position of the spool, and emits an abnormality signal when it is judged that the spool is out of position.

The pressures in the cylinder chambers 194, 195 are introduced, via the passages 207, 208, into the cavity in which the control member 235 connected to the solenoid 200 is received. Further, the high pressures in the chambers 202, 215 on both sides of the centering mechanism are also introduced into the cavity via the passage 206. Under the normal condition, the control member 235 of the solenoid 200 is shifted to the right to block the ports 243, 241', 242 by the seal portions 239, 240, 241. Thus, the oil pressures in the passages 206, 207, 208 are isolated from each other, with the result that the steering shaft 180 is shifted to the left or right by the pressure applied to the cylinder chamber 194 or 195.

However, when an abnormality occurs, the solenoid 200 is deenergized, with the result that the control member 235 is shifted to the left by the biasing force of the spring 246, thus opening the ports 241', 242, 243 simultaneously to provide the same pressure in these ports immediately. As a result, the pressure in the chamber 194 becomes the same as that in the cylinder 195, the drive of the steering shaft 180 ceases. At the same time, the chambers 202, 215 and the annular space 212 have the same pressure, with the result that the spring holders 224, 225 are shifted away from each other to abut against the annular ridges 222, 223, respectively, thus centering the steering shaft 180.

What is claimed is:

1. A rear wheel steering apparatus for a vehicle, comprising a hydraulic cylinder for axially displacing a steering rod connected to left and right rear wheels, a centering spring for biasing said steering rod toward a neutral position, and a centering spring cancelling mechanism for preventing a biasing force of said centering spring from acting on said steering rod, characterized in that: a partition wall of said hydraulic cylinder defining an oil chamber in the cylinder is formed as a cup shape having a central concave portion which constitutes a pressure chamber of said centering spring cancelling mechanism.

2. A rear wheel steering apparatus according to claim 1, further comprising a centering spring disposed in a collar member for supporting said partition wall, a seal member for sealing a gap between the collar member and the centering spring cancelling mechanism, an oil passage provided between a housing and an outer surface of said collar member for communicating with an oil reservoir, and a hole in said collar communicating with the oil passage.

3. A rear wheel steering apparatus for a vehicle, comprising a hydraulic cylinder for axially displacing a steering rod connected to left and right rear wheels, and a control valve for controlling the supply and discharge of oil with respect to said hydraulic cylinder, and wherein the steering rod is displaced by hydraulic pressure alone to steer the rear wheels, characterized in that: a pressure control valve is disposed upstream from said control valve to maintain a main pressure constant by balancing with the main pressure alone.

4. A rear wheel steering apparatus for a vehicle, comprising a hydraulic cylinder for axially displacing a steering rod connected to left and right rear wheels, and a control valve for controlling the supply and discharge of oil with respect to said hydraulic cylinder, and wherein the steering rod is displaced by hydraulic pressure alone to steer the rear wheels, characterized in that:
   a pressure sensor is provided for detecting a main pressure;
   a control valve sensor is provided for detecting an operating condition of said control valve;
   a rear wheel steering angle sensor is provided for detecting a rear wheel steering angle on the basis of axial displacement of said steering rod;

a fail-safe means is provided for disabling steering of the rear wheels by preventing the axial displacement of said steering rod through said hydraulic cylinder; and a fail-safe discrimination control means is provided for initiating operation of said fail-safe means on the basis of signals from the aforesaid sensors.

5. A hydraulic pressure supplying system for a rear wheel steering apparatus, comprising:

a rear wheel steering mechanism including a steering rod shiftable axially to steer rear wheels, a housing supporting said steering rod for axial movement, a cylinder chamber formed around said steering rod, and a piston disposed on said steering rod for sliding movement within said cylinder chamber and dividing said cylinder chamber into first and second cylinder chambers;

a spool valve mechanism for supplying pressurized oil from a pressurized oil source to said first cylinder chamber and said second cylinder chamber, selectively, to shift said steering rod axially and thereby steer the rear wheels; and a centering mechanism including two annular portions protruding radially from said steering rod, two spring holders disposed between said annular portions and respectively abuttable against said annular portions, a spring chamber formed between the two spring holders, spring means disposed in said spring chamber for biasing said spring holders toward said annular portions, limiting means disposed in said housing for limiting movements of said spring holders by abutting against said spring holders, and two pressure chambers respectively disposed at sides of said spring holders opposite to said spring means and communicating with said pressurized oil source;

said centering mechanism urging said spring holders out of abutment with said annular portions, in opposition to a biasing force of said spring means, by supplying the pressurized oil from said pressurized oil source to said two pressure chambers and thereby preventing the biasing force of said spring means from acting on said steering rod in a normal condition;

said centering mechanism reducing a pressure difference between said pressure chambers and said spring chamber in an abnormal condition, such that the biasing force of said spring means urges said spring holders into abutment with said limiting means and thereby acts on said steering rod to maintain said steering rod in a neutral position.

6. A hydraulic pressure supplying mechanism according to claim 5, wherein said centering mechanism has a passage interconnecting said pressure chambers and disposed in said steering rod, and wherein oil from said pressurized oil source is supplied directly to one of said pressure chambers and supplied to the other pressure chamber through said passage of said steering rod.

7. A hydraulic pressure supplying system for a rear wheel steering apparatus, comprising:

a rear wheel steering mechanism including a steering rod shiftable axially to steer rear wheels, a housing supporting said steering rod for axial movement, a cylinder chamber formed around said steering rod, and a piston disposed on said steering rod for sliding movement within said cylinder chamber and dividing said cylinder chamber into first and second cylinder chambers;

a spool valve mechanism for supplying pressurized oil from a pressurized oil source to said first cylinder chamber and said second cylinder chamber, selectively, by shifting a spool valve, thereby shifting said steering rod axially to steer the rear wheels;

shifting amount detecting means for detecting an axial shifting amount of said spool valve and outputting a position signal;

control means for comparing said position signal and a reference signal for said spool valve and outputting an abnormality signal when it is judged that said spool valve is shifted abnormality; and a fail-safe mechanism responsive to said abnormality signal for returning said steering rod to a neutral position by equalizing the pressure in said first cylinder chamber with the pressure in said second cylinder chamber.

8. A hydraulic driving device for a rear wheel steering apparatus, comprising:

a rear wheel steering mechanism including first and second cylinder chambers, and a steering rod axially shiftable by hydraulic pressure applied to said first cylinder chamber and said second cylinder chamber, selectively;

a spool valve mechanism including a first passage for communicating a hydraulic pressure supply circuit and a return circuit selectively with said first cylinder chamber and a second passage for communicating said hydraulic pressure supply circuit and said return circuit selectively with said second cylinder chamber, third and fourth cylinder chambers, a spool for closing and opening said first and second passages by being shifted axially by hydraulic pressures applied to said third and fourth cylinder chambers, and a first biasing member for biasing said spool in one direction and a second biasing member for biasing said spool in an opposite direction;

a first pilot pressure generating means including a fifth cylinder chamber communicating with a hydraulic pressure source and a sixth cylinder chamber communicating with said third cylinder chamber, a first fixed restriction disposed between said sixth cylinder chamber and said hydraulic pressure source, a first rod member shiftable axially within one of said fifth cylinder chamber and said sixth cylinder chamber, and a first solenoid for driving said first rod member axially; and a second pilot pressure generating means including a seventh cylinder chamber communicated with said hydraulic pressure source and an eight cylinder chamber communicated with said fourth cylinder chamber, a second fixed restriction disposed between said eighth cylinder chamber and said hydraulic pressure source, a second rod member shiftable axially within one of said seventh cylinder chamber and said eighth cylinder chamber, and a second solenoid for driving said second rod member axially.

9. A pressurized oil supplying device comprising:

a rear wheel steering mechanism including first and second cylinder chambers, and a steering rod shifted axially by hydraulic pressure applied to said first cylinder chamber and second cylinder chamber, selectively, to steer rear wheels;

a spool valve mechanism which can be switched to supply liquid to said first cylinder chamber and said second cylinder chamber selectively;

a centering mechanism for holding said steering rod in a neutral position; and a fail-safe mechanism for preventing axial shifting of said steering rod by said rear wheel steering mechanism by equalizing a pressure in said first cylinder chamber with a pressure in said second cylinder chamber and by making said centering mechanism operative when an abnormal condition occurs.

10. A pressurized oil supplying device according to claim 9, wherein said centering mechanism includes a pair of shift members shiftable on said steering shaft, a bias member for biasing said shift members away from each other into abutment with corresponding abutment portions of said steering shaft, a first chamber provide between said shift members and at least one second chamber to be supplied liquid constantly and provided to the outside of one of said shift members.

11. A pressurized oil supply device according to claim 9, wherein said fail-safe mechanism comprises first and second passages respectively communicated with said first and second cylinder chambers, third and fourth passages respectively communicated with said first and second chambers of said centering mechanism, and a control member for equalizing the pressure between said first and second passages, and between said third and fourth passages.

12. A pressurized oil supplying device comprising:

a rear wheel steering mechanism including first and second cylinder chambers, and a steering rod shifted axially by hydraulic pressure applied to said first cylinder chamber and said second cylinder chamber, selectively, to steer rear wheels;

a spool valve mechanism including third and fourth cylinder chambers to which pressurized oil is supplied from a hydraulic pressure source via a pressurized oil supply line, and a spool valve shifted axially by hydraulic pressure applied to said third cylinder chamber and said fourth cylinder chamber, selectively, to control the supply of pressurized oil to said first and second cylinder chambers;

a sensor provided in said pressurized oil supply line for detecting a supply pressure of the pressurized oil; and a fail-safe mechanism for equalizing a pressure in said first cylinder chamber with a pressure in said second cylinder chamber to return said steering rod to a neutral position when said sensor detects that the hydraulic pressure in said pressurized oil supply line is decreased below a predetermined value.

* * * * *